United States Patent [19]
Burberry

[11] Patent Number: 5,000,531
[45] Date of Patent: Mar. 19, 1991

[54] PASSIVE BYPASS FOR FIBER OPTIC RING NETWORK

[75] Inventor: Lee M. Burberry, West Melbourne, Fla.

[73] Assignee: Harris Corporation, Melbourne, Fla.

[21] Appl. No.: 355,222

[22] Filed: May 22, 1989

[51] Int. Cl.$^5$ .................. G02B 6/28; G02B 6/26; G02F 1/00
[52] U.S. Cl. .................. 350/96.16; 350/96.15; 455/610
[58] Field of Search ............... 350/96.10, 96.15, 96.16, 350/96.18, 96.20, 96.21; 455/610, 612

[56] References Cited

U.S. PATENT DOCUMENTS

| | | | |
|---|---|---|---|
| 4,452,507 | 6/1984 | Winzer | 350/96.20 |
| 4,479,697 | 10/1984 | Kapany et al. | 350/96.18 |
| 4,484,793 | 11/1984 | Laude | 350/96.18 X |
| 4,486,071 | 12/1984 | Levinson | 350/96.18 |
| 4,519,670 | 5/1985 | Spinner et al. | 350/96.15 |
| 4,569,569 | 2/1986 | Stewart | 350/96.19 |
| 4,651,315 | 3/1987 | Laude | 370/3 |
| 4,675,860 | 6/1987 | Laude et al. | 370/3 |
| 4,735,478 | 4/1988 | Hily et al. | 350/96.16 |

OTHER PUBLICATIONS

Laser Focus/Electro-Optics, Aug. 1988, pp. 142 and 143.
EIR, Inc. Product Brochure.

Primary Examiner—Akm Ullah
Attorney, Agent, or Firm—John L. DeAngelis, Jr.

[57] ABSTRACT

A bypass for an optical fiber ring network, including a first partially reflective and partially transmissive surface and a second substantially reflective surface located behind the first surface. Each node of the network includes a transmitting device and a receiving device, each of which is served by an optical fiber. There is also an incoming fiber that supplies signals from the network and an outgoing fiber that is used to place signals on the network. With this invention, the transmitting, incoming, receiving, and outgoing fibers are arranged such that the signal from the transmitting fiber is reflected off the first surface onto the outgoing fiber. The signal from the incoming fiber is reflected off the first surface onto the receiving fiber and also reflected from the second surface onto the outgoing fiber. This feature allows incoming signals to be both received at the node and also passed onto the next node of the ring, which is especially important when the node is inoperable.

5 Claims, 4 Drawing Sheets

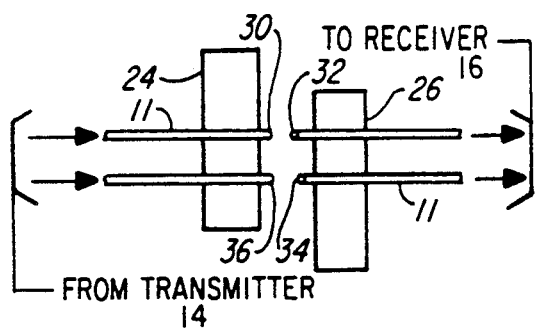
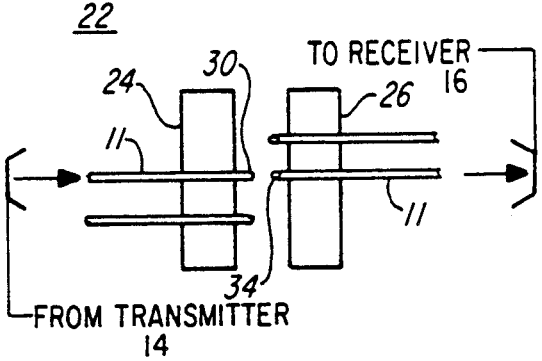
FIG. 2A (PRIOR ART)　　　FIG. 2C (PRIOR ART)
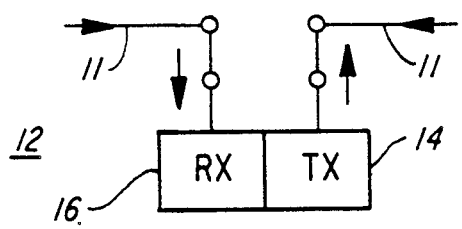
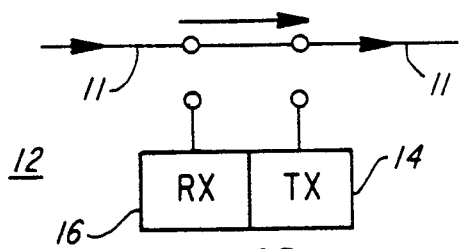
FIG. 2B (PRIOR ART)　　　FIG. 2D (PRIOR ART)
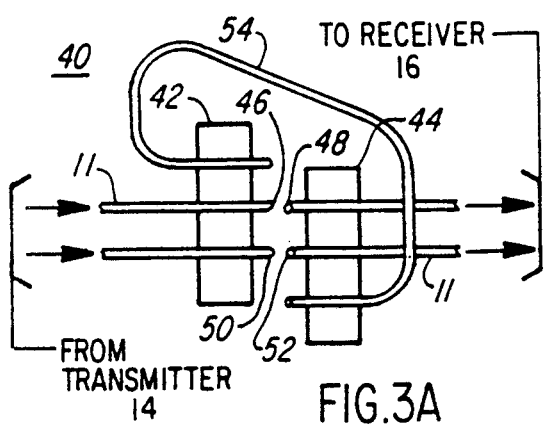
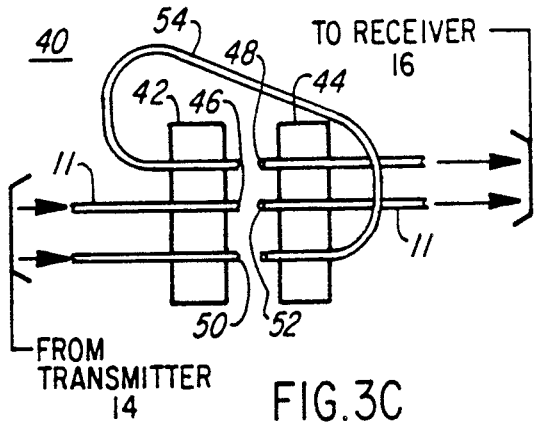
FIG. 3A (PRIOR ART)　　　FIG. 3C (PRIOR ART)
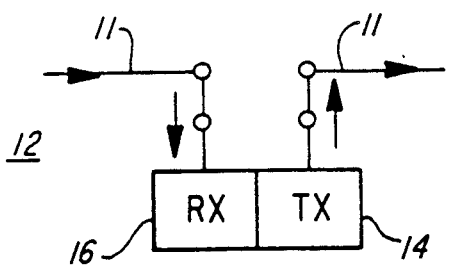
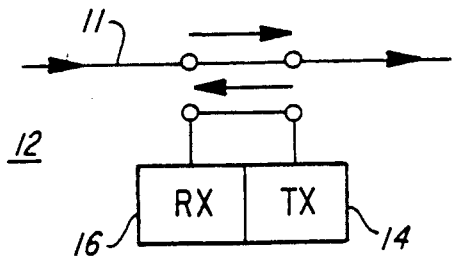
FIG. 3B (PRIOR ART)　　　FIG. 3D (PRIOR ART)

PASSIVE BYPASS FOR FIBER OPTIC RING NETWORK

FIELD OF THE INVENTION

This invention relates to a passive bypass for a fiber optic ring network for injecting a signal onto and receiving a signal from the network at each node while also providing a signal bypass path at each node.

BACKGROUND OF THE INVENTION

FIG. 1 illustrates a fiber optic ring network 10 having a bus 11 connecting a plurality of nodes 12. Each node includes a transmitter 14 and a receiver 16 for injecting data onto and receiving data from the network 10. As shown, all data on the network 10 passes around the ring in one direction from one active node to the next. Since the data is typically received and regenerated at each node 12, if any node 12 is inoperable, the signal on the network 10 must bypass the inoperable node 12 and be propagated to the next node 12. Each node 12 normally receives data from the previous node 12, and if the data is destined for a different node (as determined from encoded destination information within the data) passes that data on to the next node in the ring 10. The data continues to travel around the ring 10 until it arrives at the destination node. Also any node 12 can determine if the previous adjacent node in the ring 10 has gone dead by looking at the signal strength of the received signal. If the signal strength falls below a set threshold, the receiving node knows that the previous node in the ring 10 is not operable and boosts its gain to start receiving data from two nodes back.

Two prior art bypass switches for fiber optic networks are illustrated in FIGS. 2A through 2D and FIGS. 3A through 3D. A bypass relay 22, as shown in FIGS. 2A through 2D, includes a stationary element 24 and a moveable element 26, shown in the on or active position in FIG. 2A. FIG. 2B is a schematic representation of the FIG. 2A position. In the active mode the signal on the optical bus 11 is received by the receiver 16 at the node 12. If the received signal is not destined for that node 12, it is retransmitted by the transmitter 14. Alternatively, the transmitter 14 can inject an original signal onto the bus 11. In FIG. 2A the active node is established by coupling an end 30 of the fiber optic bus 11 to an end 32 that is connected to the receiver 16. Likewise an end 34 of the fiber optic bus 11 is coupled to an end 36 that is connected to the transmitter 14. In FIG. 2C the bypass switch 22 is shown in the off or inactive position. Here the moveable element 26 is shifted with respect to the stationary element 24 so that the end 30 is coupled to the end 34, providing a continuous path for the data on the bus 11 and bypassing the transmitter 14 and the receiver 16. A schematic illustration of the inactive position is shown in FIG. 2D.

FIGS. 3A through 3D illustrate a second bypass switch 40, including a stationary member 42 and a moveable member 44. In FIG. 3A the stationary member 42 and the movable member 44 are aligned so that a signal on the optical bus 11 is coupled to the receiver 16 via opposing end faces 46 and 48. End faces 50 and 52 are also aligned so that the signal from the transmitter 14 is coupled onto the optical bus 11. The schematic representation of the physical arrangement of FIG. 3A is illustrated in FIG. 3B. In FIG. 3C the bypass switch 40 is shown in an off or inactive position where the end face 46 is coupled to the end face 52 for uninterrupted transmissions along the optical bus 11. This arrangement is illustrated schematically in FIG. 3D. Also, in FIG. 3C a fiber optic segment 54 is coupled between the end faces 48 and 50. The fiber optic segment 54 connects the receiver and transmitter directly enabling self-testing of the transmitter 14 and the receiver 16. This embodiment is illustrated schematically in FIG. 3D.

Another prior art embodiment is illustrated in FIG. 4 where the light exiting from an input fiber 58 is focused by a lens 60 onto a beam splitter 62. A portion of the light reflected from the beam splitter 62 is directed toward a lens 64, where it is focused onto a fiber optic segment 66 coupled to the receiver 16. The remainder of the light impinging upon the beam splitter 62 is transmitted therethrough to a beam splitter 68. A portion of the light exits the beam splitter 68 and is focused by a lens 70 onto an outgoing fiber segment 72. To transmit a signal from the node illustrated in FIG. 4 the transmitter 64 is activated to propagate a signal through a fiber optic segment 74 and a lens 76. Light rays from the lens 76 strike the beam splitter 68 and are reflected towards the lens 70 and the outgoing fiber segment 72.

The primary disadvantage of these prior art fiber optic bypass schemes is their complexity, use of multiple parts, and requirement for mechanical movement to move the optical fibers into the desired position for, transmitting or receiving the optical signals or for node-bypassing. The use of moving parts, while suitable in some applications, is not acceptable for fiber optic ring networks intended for adverse environments.

SUMMARY OF THE INVENTION

The fiber optic bypass switch of the present invention is a passive device having no moving parts and requiring no electricity to operate. Because it is truly passive it can be made very rugged and used in adverse environments. This invention reduces the complexity of the prior art passive optical bypass switch, illustrated in FIGS. 2 through 4, from six parts and an associated mounting structure down to a single part, reducing cost and manufacturability. The invention essentially combines the functions of the four lenses and two beam splitters in the FIG. 4 embodiment into one wedged meniscus partial mirror.

The objective of the present invention is to provide a bypass at each station or node that allows signal detection and transmission at that node, and in the case of a node breakdown, a technique for permitting the optical signal to bypass that node. The bypass feature is critical, because the data is circulated around the ring from node to node; if the data is not intended for the receiving node it is simply retransmitted to the next node in the ring. When a node breaks down a bypass feature is required to allow the data to bypass the failed node and continue its journey to the next operating node in the ring.

The invention is preferably carried out by using a wedged meniscus mirror having a front surface that is partially reflecting and partially transmitting and a back surface that is primarily reflective. The wedged feature of the mirror refers to the slight displacement of the rear surface with respect to the front surface. The emitter (transmitter), detector (receiver), incoming, and outgoing fibers are arranged in a cross pattern with the emitter fiber arranged opposite the outgoing fiber and the incoming fiber placed opposite the detecting fiber. With this fiber arrangement and using the mirror as described, incoming signals from the incoming fiber are reflected off of the front surface onto the detector (receiver) fiber. This fiber is connected to the receiver at the station for receiving and decoding incoming signals. Signals transmitted from the station through the transmitter or emitter fiber are also reflected off the front surface to the outgoing fiber, where they are carried to the next node on the ring. To provide the bypass function, signals from the incoming fiber are reflected off of the back surface to the outgoing fiber. Signals from the emitter fiber are also reflected off of the back surface, but these are reflected off into space. This extra path from the emitted signal may also be utilized to monitor the condition of the emitter with an extra detector. Also the large spatial separation of the beam from the primary receiver reduces crosstalk in the system. Thus the desired result of reflections from the emitter to the outgoing fiber, from the incoming fiber to the detecting fiber, and also from the incoming fiber to the outgoing fiber has been achieved with no moving parts.

BRIEF DESCRIPTION OF THE DRAWINGS

The present invention can be more easily understood, and the further advantages and uses thereof more readily apparent, when considered in view of the description of the preferred embodiments and the following figures in which:

FIGS. 2A-2D, 3A-3D, and 4 illustrate prior art bypass arrangements; and

DESCRIPTION OF THE PREFERRED EMBODIMENTS

Figure 1:
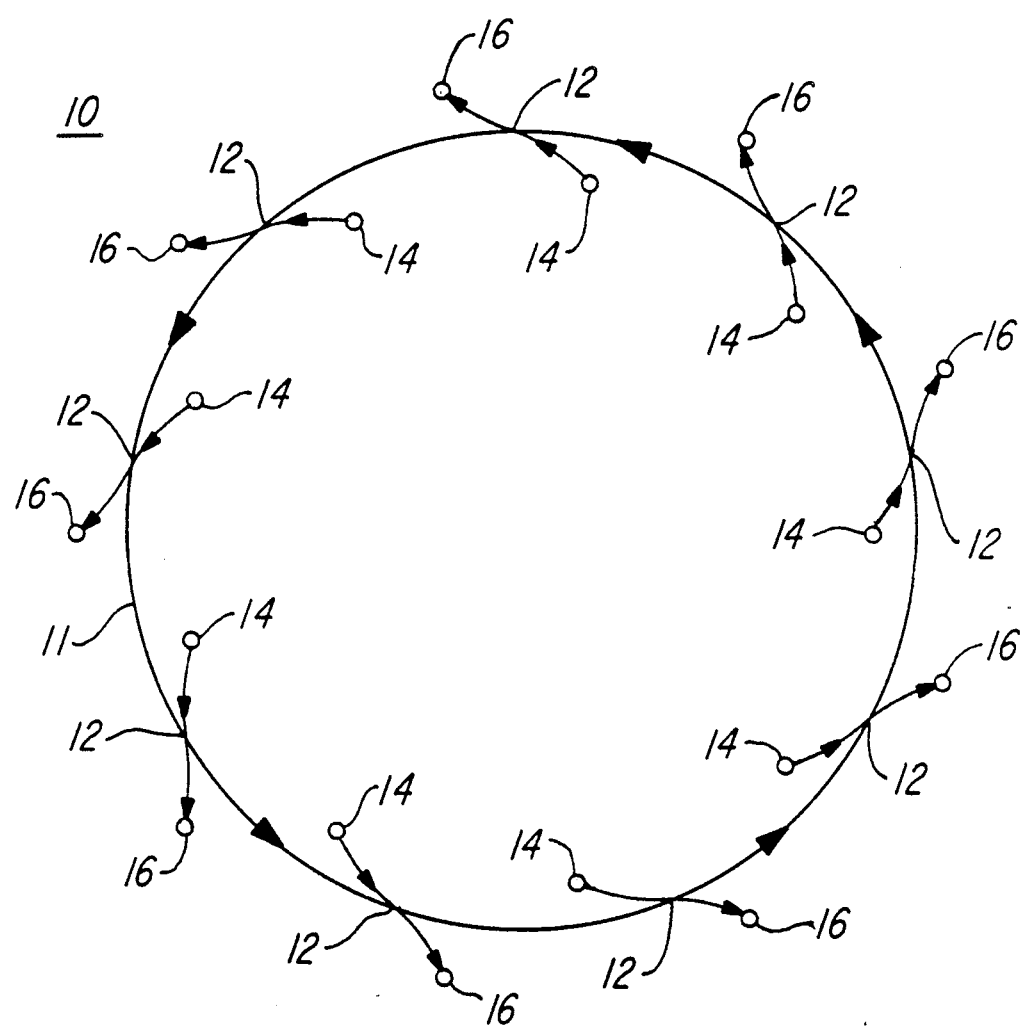
FIG. 1 illustrates a ring network in which the present invention can be utilized.
Figure 4:
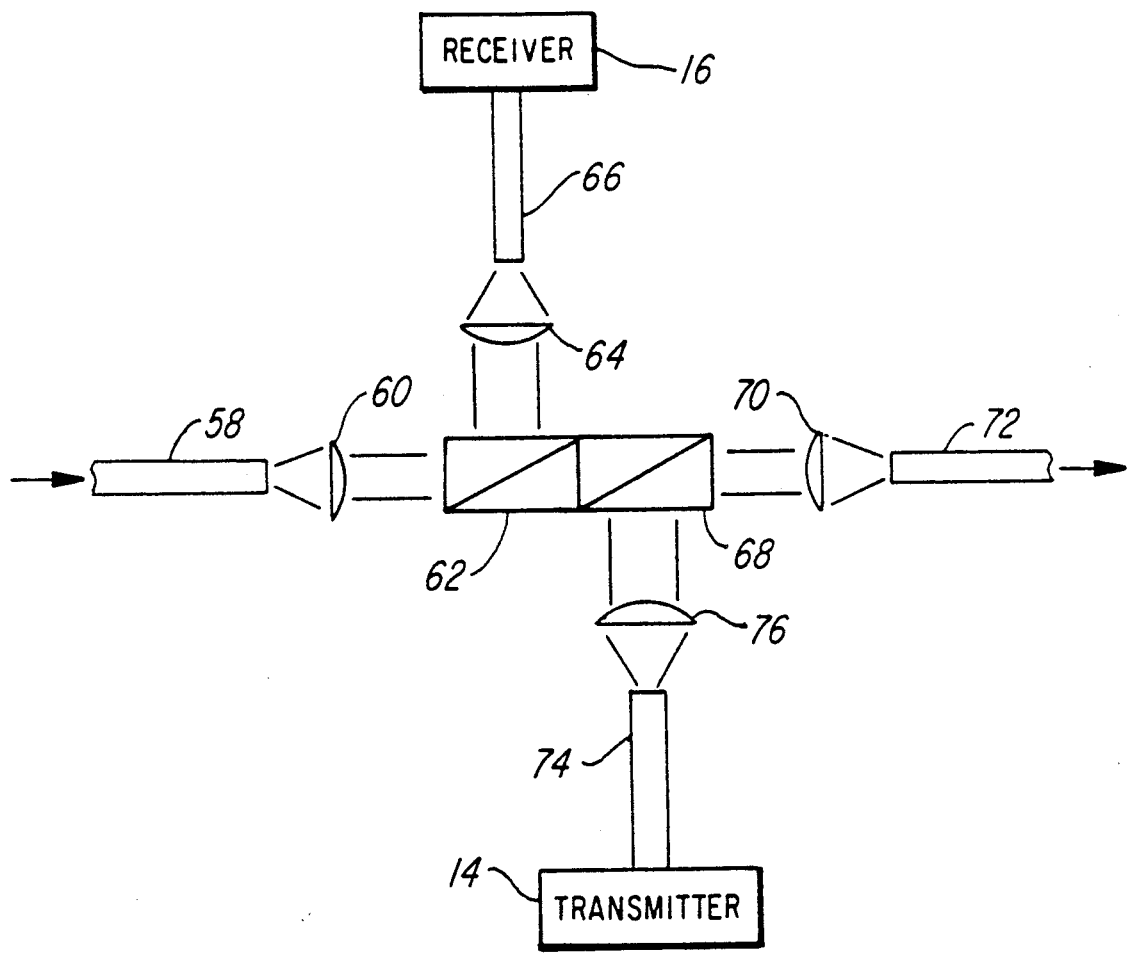
Figure 5:
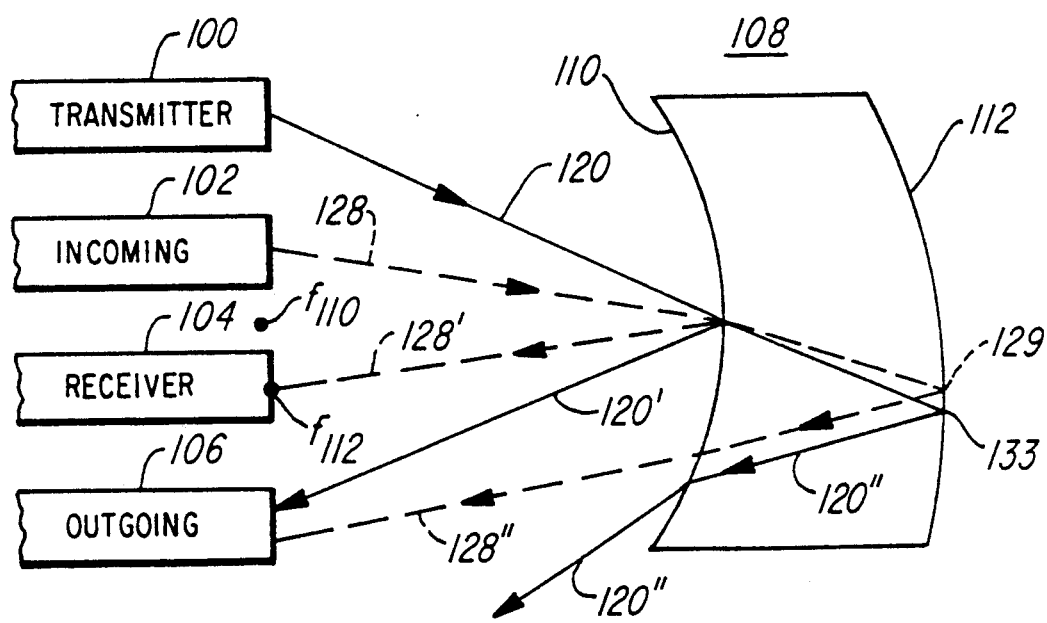
FIGS. 5 through 7 illustrate a bypass constructed according to the teachings of the present invention.
Figure 6:
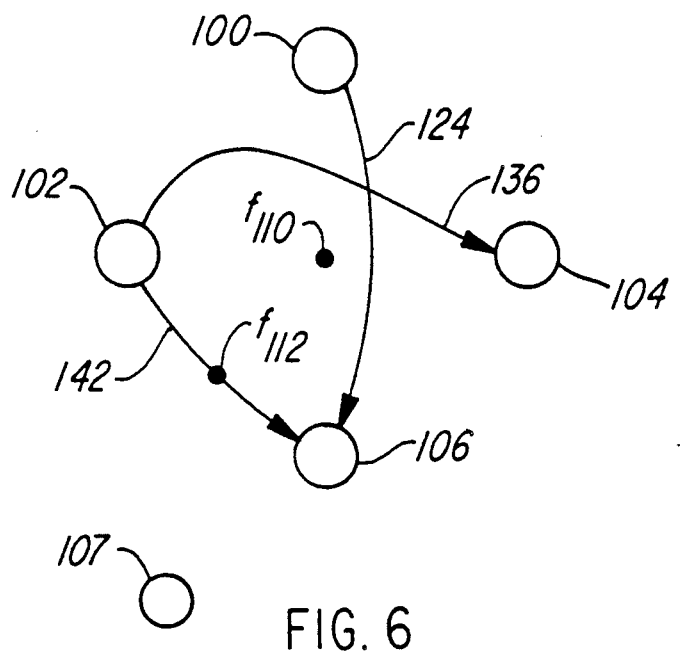

Referring to FIG. 5, there is shown a transmitter (or emitter) fiber 100 connected to a transmitting device at a node or station. Also illustrated are an incoming fiber 102 and an outgoing fiber 106, which are identical in function to the prior art input fiber segment 58 and the outgoing fiber segment 72, respectively of FIG. 4. Also illustrated is a receiver (or detector) fiber 104 connected to a receiving device at the node. Although the FIG. 5 embodiment shows the fibers 100, 102, 104, and 106 in a straight line orientation, this has been done for representational purposes only, as the fibers are physically arranged in a cross orientation, as shown in FIG. 6, so that the fibers are symmetric with reference to the focal point $f_{110}$, which is along the axis of symmetry of the front surface 110.

A wedged meniscus mirror 108 has a front surface 110 that is partially reflecting and partially transmitting, and a rear surface 112, that is primarily reflecting. Also shown are the focal point for the front surface 110, labeled $f_{110}$, and the focal point for the rear surface 112, labeled $f_{112}$. As is well known in the art, the focal point for a concave mirror is also the center of radius for that mirror. In FIG. 5, the front surface 102 and the rear surface 112 are confocal, meaning that each mirror has the same center of radius and focus, but the rear surface 112 is slightly tilted or displaced with respect to the front surface 110 to provide the "wedge" feature. This displacement can be accomplished by tilting the rear surface 112 with respect to the front surface 110 or moving the rear surface 112 so that it is slightly off center with respect to the front surface 110. The rear surface 112 is tilted such that its focus is midway between the two fibers to be imaged. That is, $f_{112}$ is located halfway between the incoming fiber 102 and the outgoing fiber 106. See FIGS. 5 and 6.

As is known by those skilled in the art, the various rays shown in FIG. 5 represent a cone of light rays. Specifically, an incident ray 120 is emitted from the transmitter fiber 100 and reflected off the front surface 110. The resultant reflected ray 120' is incident onto the outgoing fiber 106. In FIG. 6, an arrow 124 represents the transmission of light from the transmitter fiber 100 to the outgoing fiber 106. An incident ray 128 from the incoming fiber 102 is also reflected off the front surface 110. The resultant reflected ray 128' is incident on the receiver fiber 104. An arrow 136 in FIG. 6 also illustrates the transmission of light from the incoming fiber 102 to the receiver fiber 104. The incident ray 128 from the incoming fiber 102 also passes through the front surface 110, is refracted at the air-lens boundary, and is reflected from the rear surface 112 at a point 129. The resultant reflected ray 128'' is refracted at the lens boundary and incident upon the outgoing fiber 106. This transmission path is indicated by an arrow 142 in FIG. 6. Because the front surface 110 is partially reflecting, the incident ray 120 also passes through the front surface 110, is refracted, reflected off the rear surface 112 at a point 133 as indicated by a reflected ray 120'', and is refracted again. But the reflected ray 120'' is not detected by any fibers in the FIG. 5 embodiment. In another embodiment, a detector could be placed to intercept the reflected ray 120'', monitoring the transmitted signal to provide a measure of its signal strength. This optional detector location is represented by a circle 107 in FIG. 6.

In the preferred embodiment, each node normally receives data only from the previous node, and if the data is destined for a different node (as determined from encoded destination information within the data word) then the receiving node retransmits that data on around the ring network 10. With this feature, any node can determine if the previous node has gone dead by looking at the strength of the received signal. If that strength falls below a set threshold the current node knows that the previous node is not there and therefore boosts its receiver gain to start receiving data from two nodes back. If this node-out design feature is desired, the bypass mirror 108 can be designed with, for example 10 dB pass through, so that each node can be discriminated by strengths of −10 dB, −20 dB, −30 dB, etc. Further, the light budget for data collection at each receiver 16 is −5.5 dB, but this is matched by a budget of −5.5 dB for injecting new signals onto the ring 10. Since these losses are equal at each node, they do not effect the discrimination levels of −10 dB between nodes.

In other embodiments the node-out determination may be unnecessary and it may therefore be desirable to minimize the losses in the bypass case by changing the reflective and transmissive characteristics of the front surface 110. But, as is known by those skilled in the art, there is a tradeoff between these reflective and transmissive properties that must be taken into consideration when designing the mirror 108 for a specific application.

Figure 7:
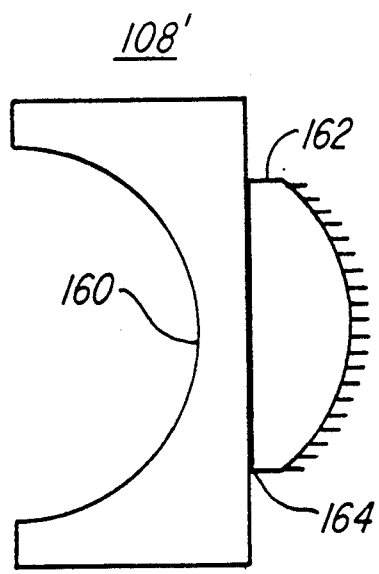

The mirror 108 shown in FIG. 5 can be purchased commercially from any vendor skilled in the art of custom lens construction. FIG. 7 illustrates an embodiment 108' that is constructed of a plano-concave lens 160 and a plano-convex lens 162. The difference in the radii of curvature of lenses 160 and 162 is equal to the sum of the lens thickness plus the cement 164 for bonding them together. In this embodiment, the Melles Griot parts 01LPK003 and 01LPX065 were used for the plano-concave lens 160 and the plano-convex lens 162, respectively. These two Melles Griot parts have confocal surfaces; the first having a radius of 12.97 mm and the second a radius of 18.67 mm, with thicknesses of 2.0 mm and 3.6 mm, respectively. The flat surfaces of the lenses 160 and 162 are glued together with 0.1 mm of optical cement, designated by reference character 164 in FIG. 7. A −4 dB partial mirror coating is applied to the concave surface of the plano-concave lens 160 and a 100 percent reflecting mirror is applied to the convex surface of the plano-convex mirror 162.

To assemble the complete embodiment shown in FIG. 5, the four fibers, 100, 102, 104, and 106, are arranged symmetrically around the optical axis at coordinates (−0.2, 0), (0, 0.2), (0.2, 0), and (0, −0.2) mm. The fibers 100, 102, 104, and 106 are held in place by V grooves etched into silicon spacers (not shown). This technique is well known in the fiber optic art. The concave surface of the plano-concave mirror 160 is mounted on the same optical center at a distance equal to the radius of curvature. Light from the incoming fiber 102 is reflected from the plano-concave mirror 160 and focused back onto the opposed outgoing fiber 106. The concave surface of the plano-concave mirror 160 also reflects the light energy from the transmitter fiber 100 to the outgoing fiber 106. The plano-concave mirror 162 reflects the light energy from the transmitter fiber 100 to the outgoing fiber 106. In this embodiment the losses of the bypass switch 108' are about −4 dB and another −1.5 dB is budgeted for coupling losses between the fibers 100, 102, 104, and 106. The resultant is a total loss of 5.5 dB (which is identical to that discussed above for the preferred embodiment).

The plano-convex lens 162 is cemented to the plano-concave lens 160 with UV curing epoxy and positioned with an XY micrometer stage. The center of the plano-convex lens 162 is positioned offset from the optical access of the plano-concave lens 160 by −0.066 mm in the X direction and 0.066 mm in the Y direction. As a result, the incident ray 128 from the incoming fiber 102 is reflected onto the outgoing fiber 106, and the reflected ray 120 from the transmitter 100 is not positioned on the receiver fiber 104, so as to eliminate cross talk. Because incident rays 120 and 128 pass through the concave surface of the plano-concave mirror 160 twice as they pass from an input to an output fiber, the loss is −8 dB, which leaves −2 dB for coupling losses and losses due to the plano-convex mirror 162 not being perfectly 100 percent reflective. The precise positioning of the plano-convex mirror 162 is done with an XY micrometer while monitoring the light out of the outgoing fiber 106. When this light is maximized, the entire bypass 108' is bathed in UV light to cure the epoxy and set the assembly up permanently. The XY micrometer stage is then removed.

While I have shown and described an embodiment in accordance with the present invention, it is understood that the same is not limited thereto but is susceptible of numerous changes and modifications as are known to a person skilled in the art. I therefore do not wish to be limited to the details shown and described herein but intend to cover all such changes and modifications as are obvious to one of ordinary skill in the art.

What is claimed is:

1. In a ring network for carrying information in the form of optical energy, including a fiber optic bus connecting a plurality of nodes, wherein each node includes a transmitter for inserting optical energy onto the bus via a transmitting fiber connected to the fiber optic bus, a receiver for detecting optical energy on the bus via a receiving fiber connected to the fiber optic bus, an incoming fiber connected to the fiber optic bus, an outgoing fiber connected to the fiber optic bus, and an optical bypass device for routing the optical energy at the node wherein said optical bypass device comprises:

a first partially reflecting and partially transmissive surface; and a second substantially reflecting surface located proximate said first surface and having a wedge orientation with respect thereto;

and wherein the transmitting fiber, the receiving fiber, the incoming fiber, and the outgoing fiber are oriented with respect to said first and said second surfaces so that optical energy from the transmitting fiber is reflected off said first surface onto the outgoing fiber, and wherin optical energy from the incoming fiber is reflected off said first surface onto the receiving fiber, and wherein optical energy from the incoming fiber is reflected off said second surface onto the outgoing fiber.

2. The optical bypass device of claim 1 wherein the wedge orientation is formed by tilting the second surface with respect to the first surface.

3. The optical bypass device of claim 1 wherein the wedge orientation is formed by offsetting the second surface with respect to the first surface so that the center of radius of the second surface is displaced from the center of radius of the first surface.

4. The optical bypass device of claim 1 wherein the transmitting fiber, the receiving fiber, the incoming fiber, and the outgoing fiber are arranged in a cross pattern with the fibers displaced 90 degrees from each other and located symmetrically with respect to the center point of the cross.

5. The optical bypass device of claim 4 wherein the transmitting fiber is located on the top leg of the cross, and wherein the outgoing fiber is located on the bottom leg of the cross, and wherein the incoming fiber is located on the left leg of the cross, and wherein the receiving fiber is located on the right leg of the cross.

* * * * *